(12) United States Patent
Blasing et al.

(10) Patent No.: US 7,119,740 B2
(45) Date of Patent: Oct. 10, 2006

(54) MILLIMETER-WAVE ACTIVE IMAGING SYSTEM WITH MODULAR ARRAY

(75) Inventors: Raymond R. Blasing, Los Altos, CA (US); Thomas W. Grudkowski, Pleasanton, CA (US); Scott T. Trosper, Meridian, ID (US)

(73) Assignee: Safeview, Inc., Santa Clara, CA (US)

( * ) Notice: Subject to any disclaimer, the term of this patent is extended or adjusted under 35 U.S.C. 154(b) by 195 days.

(21) Appl. No.: 10/728,637

(22) Filed: Dec. 5, 2003

(65) Prior Publication Data

US 2005/0122258 A1   Jun. 9, 2005

(51) Int. Cl.
*G01S 13/89* (2006.01)

(52) U.S. Cl. ............................ 342/179; 342/22; 342/27
(58) Field of Classification Search ................ 342/179, 342/22, 27
See application file for complete search history.

(56) References Cited

U.S. PATENT DOCUMENTS

| | | | |
|---|---|---|---|
| 4,790,762 A | 12/1988 | Harms et al. | |
| 4,901,084 A | 2/1990 | Huguenin et al. | |
| 4,910,523 A | 3/1990 | Huguenin et al. | |
| 4,940,986 A | 7/1990 | Huguenin | |
| 5,047,783 A | 9/1991 | Hugenin | |
| 5,073,782 A | 12/1991 | Huguenin et al. | |
| 5,170,169 A | 12/1992 | Stephan | |
| 5,182,562 A * | 1/1993 | Witte ........................ | 342/25 A |
| 5,202,692 A | 4/1993 | Huguenin et al. | |
| 5,227,800 A | 7/1993 | Huguenin et al. | |
| 5,455,590 A | 10/1995 | Collins et al. | |
| 5,557,283 A | 9/1996 | Sheen et al. | |
| 5,760,397 A | 6/1998 | Huguenin et al. | |
| 5,859,609 A | 1/1999 | Sheen et al. | |
| 6,057,761 A | 5/2000 | Yukl | |
| 6,507,309 B1 | 1/2003 | McMakin et al. | |
| 6,518,915 B1 | 2/2003 | Schutz et al. | |
| 6,791,487 B1 | 9/2004 | Singh et al. | |
| 2002/0044102 A1* | 4/2002 | Yokoshima et al. ........ | 343/895 |
| 2002/0130804 A1* | 9/2002 | McMakin et al. ............ | 342/22 |
| 2004/0056790 A1 | 3/2004 | Lovberg et al. | |

OTHER PUBLICATIONS

McMillan, R.W, Currie, N.C., Ferris, D.D., Jr., and Wicks, M.C. "Concealed Weapon Detection using Microwave and Millimeter Wave Sensors". Microwave and Millimeter Wave Technology Proceedings, 1998. pp. 1-4.*

(Continued)

*Primary Examiner*—Thomas H. Tarcza
*Assistant Examiner*—Matthew Barker
(74) *Attorney, Agent, or Firm*—Kolisch Hartwell, P.C.

(57) ABSTRACT

Active millimeter-wave imaging systems can include an antenna apparatus configured to transmit toward and receive from a subject in a subject position, electromagnetic radiation. A controller can include a transceiver configured to operate the antenna apparatus and produce an output representative of the received radiation, and a processor adapted to convert the transceiver output into image data representative of an image of the subject. The antenna apparatus may move in a partial or continuous loop around the subject, toward or away from the subject, or in an opposite direction to an associated antenna apparatus. Antenna units in the antenna apparatus may be oriented at different angular positions along an array. Antenna arrays may also be formed of a plurality of array segments, and a group of arrays may be combined to form an antenna apparatus.

7 Claims, 7 Drawing Sheets

OTHER PUBLICATIONS

Sheen, D.M, McMakin, D.L., and Hall, T.E. "Three-Dimensional Millimeter-Wave Imagingfor Concealed Weapon Detection". IEEE Transactions on Microwave Theory and Techniques. vol. 49, Issue 9. pp. 1581-1592. May 2001.*

U.S. Appl. No. 10/697,965 filed Oct. 30, 2003, unknown.

U.S. Appl. No. 10/697,848 filed Oct. 30, 2003, unknown.

U.S. Appl. No. 10/607,552, filed Jun. 26, 2003, unknown.

U.S. Appl. No. 10/301, 552, Nov. 21, 2002, McMakin.

*The Dielectric People Portal II,* Spatial Guardian Inc., www.spatialguardian.com/products/people_portal/index.shtml.

*Transportation Security What Works,* Spatial Guardian Inc., www.spatialguardian.com/news_transec_1102.shtml, Nov. 2002.

\* cited by examiner

MILLIMETER-WAVE ACTIVE IMAGING SYSTEM WITH MODULAR ARRAY

BACKGROUND

Millimeter wave signals are used for radar and telecommunications. They are also capable of being used for producing an image of a subject by directing millimeter-wave signals at the subject and detecting the reflected signal. Examples of such imaging systems have been described in U.S. Pat. Nos. 5,455,590; 5,557,283; 5,859,609; 6,507,309; 6,703,964; and 6,876,322; and U.S. patent application Publication Nos. 2004/0090359 and 2004/0140924 which patent references are incorporated herein by reference.

When imaging systems are used for surveillance of persons, it may be desirable for the system to quickly, conveniently and safely perform the surveillance. This is particularly true in situations where the surveillance delays the intended progress of the person being surveilled, such as prior to boarding a public transportation vehicle, or prior to entering a public or protected facility. Accordingly, different surveillance situations may be benefited by using differently configured surveillance or interrogation stations in which a person is positioned during imaging.

BRIEF SUMMARY OF THE DISCLOSURE

Active imaging systems can include an antenna apparatus configured to transmit toward and receive from a subject in a subject position, millimeter-wave electromagnetic radiation. The antenna apparatus transmits and receives radiation from positions spaced from the subject position and distributed along a locus of points or aperture facing the subject. A controller can include a transceiver configured to operate the antenna apparatus and produce an output representative of the received radiation, and a processor adapted to convert the transceiver output into image data representative of an image of the subject.

Various configurations of an antenna apparatus are possible. A particular configuration can be selected as appropriate for a particular application. For example, the antenna apparatus may include one or a plurality of antenna units, such as a linear or two-dimensional array of antenna units. The antenna unit or units may move along a curved path or be in an array that is curved or straight, and may be fixed or move in a curved or straight path. Antenna units or one or more arrays of antenna units may be fixed in position and pivot to scan a subject from one or more positions distributed about the subject. An assembly, in which an antenna array is adapted to move along a defined path, may move in various ways. For example, the assembly may move along a path extending at least partially around the subject, toward or away from the subject, or in an opposite direction to an associated assembly. Such antenna units may also be oriented at different angular positions along an array. Antenna arrays may also be formed of a plurality of array segments, and a group of arrays may be combined to form an antenna apparatus.

DETAILED DESCRIPTION OF THE VARIOUS EMBODIMENTS

Figure 1:
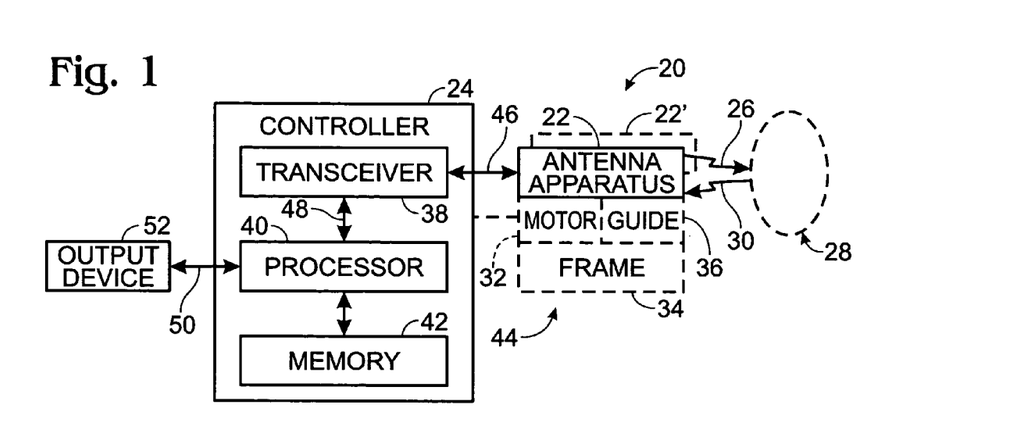
FIG. 1 is a general diagram showing an active imaging system.

Shown generally at 20 in FIG. 1 is an active imaging system. System 20 includes an antenna apparatus 22 and a controller 24. The system is active in the sense that the antenna apparatus transmits electromagnetic radiation 26 toward a subject 28, and in response, the subject emits or reflects electromagnetic radiation 30 that is detected by the antenna apparatus. A subject includes all that is presented in an interrogation station of an imaging system for imaging, whether human, animal, or inanimate object. For example, if a person is in an interrogation station for imaging, the subject includes the person as well as any objects supported on the person, such as watches, keys, jewelry, pocket or other knives, coins, clothing accessories, guns, or any other objects that can be imaged. A subject may include one or more persons, animals, objects, or combination of these.

Electromagnetic radiation may be selected from an appropriate frequency range, such as in the range of about 200 megahertz (MHz) to about one terahertz (THz), generally referred to herein as millimeter-wave radiation. Satisfactory imaging may be realized using electromagnetic radiation in the reduced frequency range of one gigahertz (GHz) to about 300 GHz. Radiation in the range of about 5 GHz to about 110 GHz may also be used for producing acceptable images. Such radiation may be either at a fixed frequency or over a range or set of frequencies using several modulation types, e.g. chirp, pseudorandom frequency hop, pulsed, frequency modulated continuous wave (FMCW), or continuous wave (CW).

Many variations of an antenna apparatus are possible. The antenna apparatus may include one or more antenna units, and each antenna unit may include one or more transmitting antennae and one or more receiving antennae. An antenna unit may include a plurality of antennae that may receive radiation in response to transmission by a single antenna. The antennae may be any appropriate type configured to transmit or receive electromagnetic radiation, such as a slot line, patch, endfire, waveguide, dipole, semiconductor, or laser. Antennae may both transmit and receive. The antennae units may have one or more individual antennae that transmit or receive like polarization or unlike polarized waveforms such as plane, elliptical, or circular polarization, and may have narrow or broad angular radiation beam patterns, depending on the application. Beam width may be relatively broad, i.e. 30–120 degrees for imaging applications that use holographic techniques, while narrow beam widths in the range of 0 to −30 degrees may be used for applications having a narrow field of view requirement. Further, a single antenna may scan a subject by mechanically moving about the subject in a one- or two-dimensional path. A one- or two-dimensional array of antenna units may electronically and mechanically scan a subject. An imaging system may include one or a plurality of antenna apparatus, such as a second antenna apparatus 22'. The antennae apparatus may be protected from the environment by suitable radome material which may be part of the apparatus, or separate, depending on the mechanical motion that is required of the antennae apparatus or array.

An imaging system may include an antenna-apparatus moving mechanism 32, represented by a motor, which moves antenna apparatus 22 relative to a subject 28. Moving mechanism 32 may be mounted relative to a frame 34 for moving the antenna along a path defined by a movement control mechanism, such as a guide 36, including associated motor indexers, encoders or other controls, as appropriate. The moving mechanism may be any appropriate mechanism that moves the antenna apparatus, and may include a stepper motor, servo motor, or other suitable device.

Controller 24 may control operation of motor 32, and coordinate the operation of antenna apparatus 22 with movement of the antenna apparatus. Controller 24 may include hardware, software, firmware, or a combination of these, and may be included in a computer, computer server, or other microprocessor-based system capable of performing a sequence of logic operations. In addition, processing can be distributed with individual portions being implemented in separate system components. In one example, controller 24 may include a transceiver 38, a processor 40, and a memory 42 coupled to the processor for storing data and operating instructions. Such instructions may be embodied as hardware, firmware, or software.

The transceiver, as contemplated herein, includes all structure and functions appropriate for generating, routing, processing, transmitting and receiving millimeter-wave signals between the antenna apparatus and the processor. The transceiver, then in this comprehensive sense, may include multiplexed switching among the antenna units, transmit and receive electronics, and electronic and logic units. The transceiver may be wholly or partly included with a central controller or be wholly or partly resident in an interrogation station 44 housing the antenna apparatus. In certain cases, more than one transceiver is desirable, such as for multiple antenna apparatus or for two dimensional array imaging systems. The transceiver thus sends to and receives from the antenna apparatus scanning signals 46, and outputs received signals 48 to processor 40.

The processor may be any analog or digital computational device, or combination of devices, such as a computer(s), microprocessor(s), or other logic unit(s) adapted to control scanning of a subject and receiving received signals 48 and produce image data 50 representative of an image of at least a portion of the subject. Image data may include any data, whether processed, partially processed or unprocessed, or sub-sets of the data, such as data for a portion of a subject, data that is manipulated in order to separate, for viewing by an operator or by another processor, objects that may represent a desired class of objects, such as man-made objects, non-physiological or non-living objects, or the like, data identifying or facilitating identification of an object or subject, or measurements or other information relating to a subject that is derived from received signals. The image data may be output to an output device 52, such as a storage device, communication link, such as a network hub, another computer or server, or directly to a display device, such as a video monitor. Memory 42 may be a single device or a combination of devices, and may be local to the processor or remote from it and accessible on a communication link or network.

Figure 2:
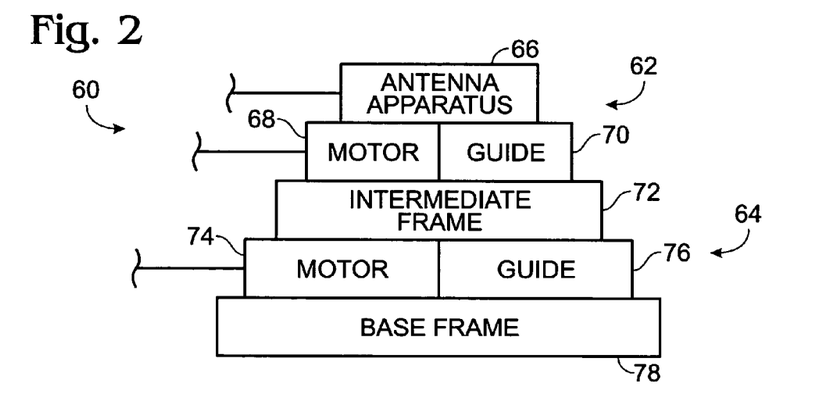
FIG. 2 is a diagram depicting general examples of interrogation stations that may be used in imaging systems.

FIG. 2 illustrates another form of interrogation station 60 for use in some imaging systems, such as system 20 discussed above. Interrogation station 60 includes an antenna apparatus assembly 62 and an antenna path-moving assembly 64. The antenna apparatus assembly may include an antenna apparatus 66, a motor 68, a guide 70, and an intermediate frame 72, similar to interrogation station 44 of imaging system 20. Components 66, 68 and 70 may be mounted relative to intermediate frame 72 for moving the antenna apparatus along an antenna path. Path-moving assembly 64 correspondingly may include a motor 74, a guide 76 and a base frame 78. Motor 74 can act on antenna apparatus assembly 62 to move the position of the antenna path. As is discussed further below, this movement of the antenna apparatus assembly may be used to control access by a person (subject) to the subject position in the interrogation station, or to provide extended scanning of the subject with the antenna apparatus.

Figure 3:
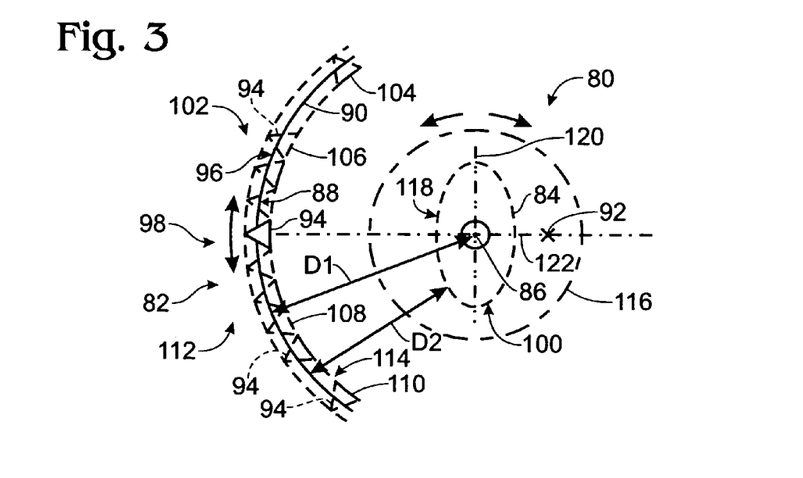
FIGS. 3–9 are simplified top views of different interrogation stations.

Following are various embodiments and configurations of interrogation stations or portions of interrogation stations that may be used in an imaging system, such as in one or more of the imaging systems illustrated in FIGS. 1 and 2. FIG. 3 illustrates a top view of an interrogation station 80 having an antenna apparatus 82 spaced from a subject position 84 having a subject center 86. Antenna apparatus 82 provides for transmitting and receiving electromagnetic radiation along a locus 88 of points, represented by an arc 90. In this example, arc 90 has a center of curvature 92 that is on the opposite side of subject center 86 from the antenna apparatus.

The shape of the locus of points may vary along its length in one or more directions. The locus of points may thus appear to be concave or convex to a subject being imaged, or may have any of various curvilinear configurations, such as an S-shaped curve, or a curve with an incrementally or continuously varying curvature, a configuration with one or more rectilinear segments, or any combination of such configurations. As used herein, the center of curvature of a portion of a locus of points containing three adjacent points is a point equally distant from the three points. The distance from the center of curvature to the three points then corresponds to the radius of an arc passing through the three points.

The antenna apparatus may include at least one antenna unit 94 that moves along a path 96 conforming to arc 90. Various positions of antenna unit 94 along path 96 are illustrated. In an embodiment having only a single antenna unit, the subject position is scanned by mechanically moving the antenna unit along an aperture of interest, such as along arc 90.

Antenna unit 94 also may be part of a vertical antenna array 98 that extends vertically along the height or a portion of the height of a subject 100, such as a person, generally occupying subject position 84. In such a case, the vertical array travels along path 96 in an imaging system as illustrated in FIG. 1. The various positions of antenna unit 94 along the path correspond to positions of antenna array 98 along the path.

Optionally, antenna unit 94 may be part of a horizontal array 102, with the horizontal array also having additional antenna units, such as antenna units 104, 106, 108 and 110. Horizontal array 102 extends along arc 90. A subject in the subject position may be scanned both electronically along the array and mechanically by movement of the array vertically.

In some embodiments, a two-dimensional array 112 may be used. Array 112 thus extends vertically and horizontally, and includes antenna units 94, 104, 106, 108, 110, and others extending vertically from the antenna units along arc 90. The subject position may then be electronically scanned from the locus of points covering an area or aperture 114 including arc 90.

Extended imaging may be provided by one or more of extending arc 90, providing one or more additional antenna apparatus, rotating a subject 100 about center 86, as indicated by circle 116, such as on a platform, and moving arc 90 around the subject position. Arc 90 may be any length considered appropriate for a particular application.

The distance D1 from the center of the subject position to arc 90 may vary along the arc. An imaging system based on a cylindrical aperture for imaging, as disclosed in U.S. Pat. No. 5,859,609, can be modified in computing image data corresponding to a cylindrical system, by compensating for the difference in distance along the arc. Such a difference can be computed during data processing, or difference values can be stored in memory, such as in a look-up table.

It will be appreciated that by positioning the center of curvature 92 of arc 90 on the opposite side of the subject center 86 from the antenna apparatus 82, the curve of the arc is more elongate along the length of the arc relative to the subject position. The longer the radius of curvature, the more gradual or straight the arc becomes. Various configurations are accordingly possible. For instance, when the interrogation station is used as a portal for an imaging system at an entrance to a facility, such as an airport, it may be desirable to have people walk along a continuous path. Having the antenna apparatus extending along gentle arcs along the sides of the path reduces the width of the imaging system, allowing it to be used in a smaller space.

If the subject, and therefore the subject position, has a shape that is cylindrical, then a cylindrical arc centered on the subject center would provide a uniform distance between the arc and the subject. This, however, also may not be the case. The shape of arc 90 may generally conform to a side 118 of a subject 100 facing arc 90 and that extends more along one axis, such as a long axis 120, than along a transverse, short axis 122, as may be the case with people, particularly with the backs of people. As a result, an arc 90 may be selected that provides a distance D2 between the locus 88 of points along arc 90 that generally conforms to an expected general shape of at least a portion of a subject.

Figure 4:
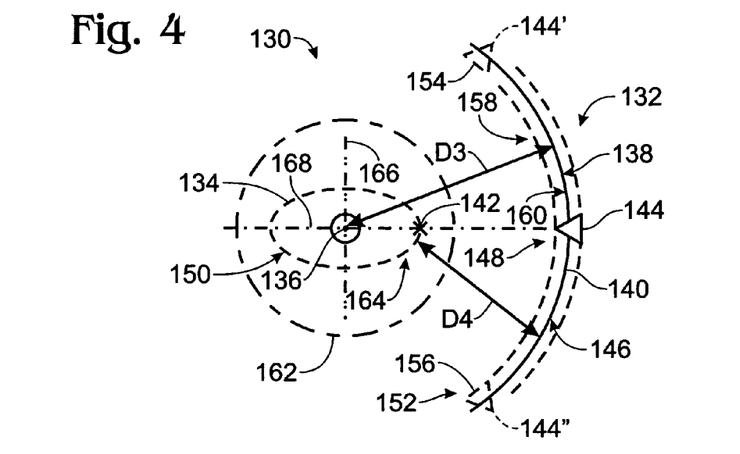

FIG. 4 illustrates a top view of a further variation of an interrogation station 130 usable in an imaging system, such as imaging system 20. Interrogation station 130 has an antenna apparatus 132 spaced from a subject position 134 having a subject center 136. Antenna apparatus 132 may provide for transmitting and receiving electromagnetic radiation along a locus 138 of points, represented by an arc 140. In this example, arc 140 has a center of curvature 142 that is on the same side of subject center 136 from the antenna apparatus. Otherwise, interrogation station 130 is similar to interrogation station 80 described above.

The antenna apparatus may include at least one antenna unit 144 that moves along a path 146 conforming to arc 140. Various positions of antenna unit 144 along path 146 are illustrated. In an embodiment having only a single antenna unit, the subject position is scanned by mechanically moving the antenna unit along an aperture of interest, such as along arc 140.

Antenna unit 144 also may be part of a vertical antenna array 148 that extends vertically along the height or portion of the height of a subject 150, such as a person, generally occupying subject position 134. In such a case, the vertical array travels along path 146 in an imaging system as illustrated in FIG. 1. The various positions of antenna unit 144 along the path correspond to positions of antenna array 148 along the path.

Optionally, antenna unit 144 may be part of a horizontal array 152, with the horizontal array also having additional antenna units, such as antenna units 154 and 156. There also may be additional units between those shown. Horizontal array 152 extends along arc 140. A subject in the subject position may be scanned both electronically along the array and mechanically by movement of the array vertically.

In some embodiments, a two-dimensional array 158 may be used. Array 158 thus may extend vertically as well as horizontally along arc 140, and may include antenna units 144, 154 and 156, and others extending vertically from the antenna units along arc 140. The subject position may then be electronically scanned from the locus of points covering an area or aperture 160 including arc 140.

Extended imaging may be provided by one or more of the following: extending arc 140; providing one or more additional antenna apparatus; rotating a subject 150 about center 136, as indicated by circle 162, such as on a platform; and moving arc 140 around the subject position. Arc 140 may be any length and shape considered appropriate for a particular application.

The distance D3 from the center of the subject position to arc 140 may vary along the arc. As discussed above, an imaging system based on a cylindrical aperture for imaging, as disclosed in U.S. Pat. No. 5,859,609, can be modified in computing image data corresponding to a cylindrical system, by compensating for the difference in distance along the arc. Such a difference can be computed during data processing, or difference values can be stored in memory, such as in a look-up table.

It will be appreciated that by positioning the center of curvature 142 of arc 140 on the same side of the subject center 136 as the antenna apparatus 132, the curve of the arc is tighter along the length of the arc relative to the subject position. The shorter the radius of curvature, the sharper the curve of the arc becomes. Various configurations are accordingly possible. For instance, when the interrogation station is used as a portal for an imaging system at an entrance to a facility, such as an airport, it may be desirable to have people walk along a continuous path. Having the antenna apparatus positioned on the sides of the path and shaped to conform generally with the sides of a person positioned on the path may be desirable.

Following this line of thinking, the shape of arc 140 may generally conform to a side 164 of a subject 150 exposed to arc 140 and that extends less along one axis, such as a short axis 166, than along an orthogonal, long axis 168, as may be the case with people, particularly with the sides of people. As a result, an arc 140 may be selected that provides a distance D4 between the locus 138 of points along arc 140 that generally conforms to an expected general shape of a portion of a subject.

Figure 5:
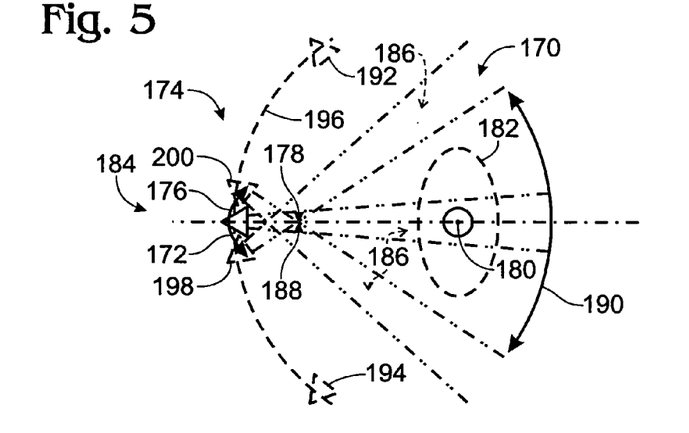

FIG. 5 illustrates a top view of an interrogation station 170 having a different design than that of interrogation station 130, but for which an antenna unit 172 of an antenna apparatus 174 moves along an arc 176 having a center of curvature 178 that is on the same side of a subject center 180 of a subject position 182 as the antenna apparatus. Antenna unit 172 may be part of an antenna array 184 that may extend along arc 176 and/or vertically.

The antenna unit may have a beam 186 that may be narrow or broad, depending upon the application. By pivoting the antenna unit about a pivot axis 188 passing through center of curvature 178, the antenna unit moves along arc 176. During such movement, the beam may scan across subject position 182, as represented by double-arrow 190. In some examples, a plurality of such pivoting antenna units, such as antenna units 192 and 194, may be distributed along a further arc, such as arc 196. Arc 196 may be an arc similar to arcs 90 and 140 mentioned above. Optionally, antenna unit 172 may also move along arc 196.

Also, in an optional embodiment, an array 184 may include additional antenna units, such as antenna units 198 and 200 positioned along arc 176. Scanning of the subject position then may be accomplished electronically by activating each of the antenna units along the arc.

Figure 6:
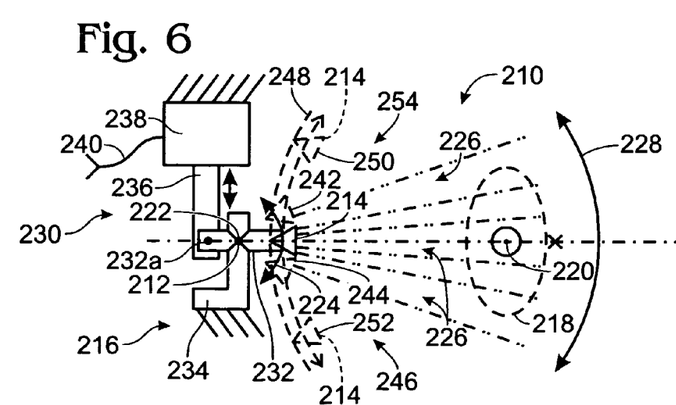

FIG. 6 illustrates a top view of an interrogation station 210 that is similar to interrogation station 170, but differs in that a pivot axis 212 for pivoting an antenna unit 214 of an antenna apparatus 216 is positioned opposite from a subject position 218 having a subject center 220. Pivot axis 212 may thus be coincident with a center of curvature 222 of an arc 224 along which the antenna unit moves. By pivoting about pivot axis 212, antenna unit 214 may scan a beam 226 across the subject position 218, as indicated by arrow 228.

Pivoting of the antenna unit may be provided in various ways by a moving mechanism 230. One way is to support the antenna unit on an arm 232 that is adapted to pivot relative to a frame 234. Arm 232 may pivot by reciprocatingly moving an arm end 232a by a drive element 236. Drive element 236 may be driven in a reciprocating fashion by a drive mechanism 238, such as a solenoid or stepper motor. The drive mechanism may be controlled by a controller via a control line 240. A similar moving mechanism also may be used for pivoting antenna units of interrogation station 170.

Optionally, a plurality of antenna units may be positioned along arc 224, such as antenna units 242 and 244, of an antenna array 246. Additionally, the antenna units may move along a larger arc 248, or pivoting antenna units may be distributed along arc 248, such as antenna units 250 and 252 of an antenna array 254.

Figure 7:
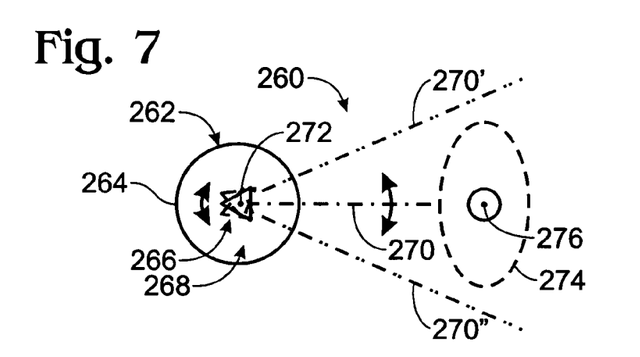

FIG. 7 illustrates a top view of an interrogation station 260 that may be a further variation of interrogation stations 170 and 210. Interrogation station 260 may include an antenna apparatus 262 that is fixed in position on a frame 264 that may include an enclosure or housing for the antenna apparatus. The antenna apparatus includes an antenna unit 266 that may be part of an antenna array 268. Each antenna unit may have a beam, represented by line 270. A moving mechanism, not shown, may pivot the antenna unit(s) of antenna apparatus 262 about a pivot axis 272 shown aligned with the antenna units. As illustrated in FIGS. 5 and 6, the pivot axis may also be spaced from the antenna units. During pivoting, beam 270 may scan across a subject position 274 having a subject center 276. When the antenna apparatus includes an array of antenna units, the antenna units may be individually pivoted or may be pivoted collectively.

Figure 8:
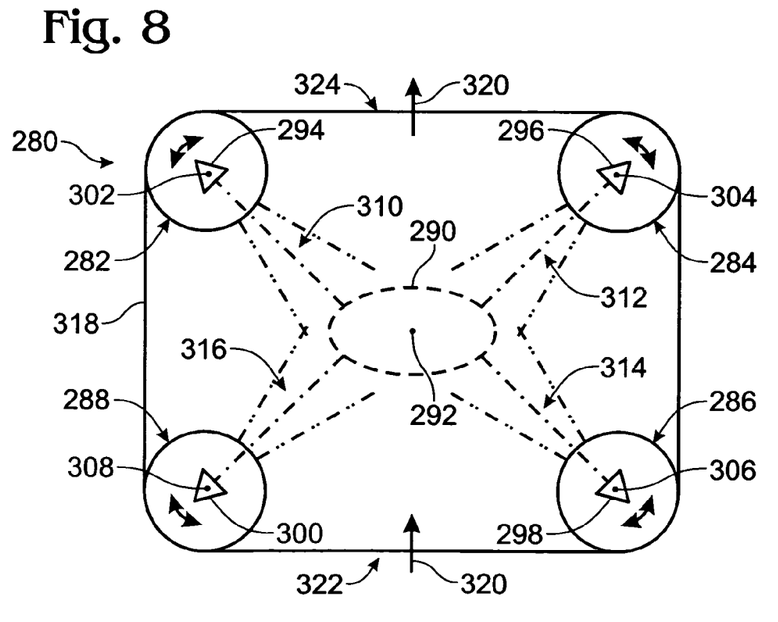

FIG. 8 illustrates an interrogation station 280 formed of a plurality of antenna apparatus, such as antenna apparatus 282, 284, 286 and 288. These antenna apparatus may each be configured like the antenna apparatus 262 of interrogation station 260, illustrated in FIG. 7. They may be distributed around a subject position 290 having a subject center 292. Antenna apparatus 282, 284, 286 and 288 have respective antenna units, represented by antenna units 294, 296, 298 and 300. The respective antenna units may pivot about respective pivot axes 302, 304, 306 and 308 for scanning respective beams 310, 312, 314 and 316 across the subject position. The various antenna apparatus may be fixedly mounted to a frame 318. As illustrated in FIGS. 5 and 6, the pivot axis may also be spaced from the antenna unit.

More or fewer antenna apparatus may be used. The antenna apparatus are positioned to provide a desired coverage of the surface of a subject positioned in the subject position. In the configuration shown, the antenna apparatus are positioned to allow a subject to enter the interrogation station along a path 320 at an entrance 322, stand at the subject position during imaging, and leave through an exit 324 opposite from the entrance.

Figure 9:
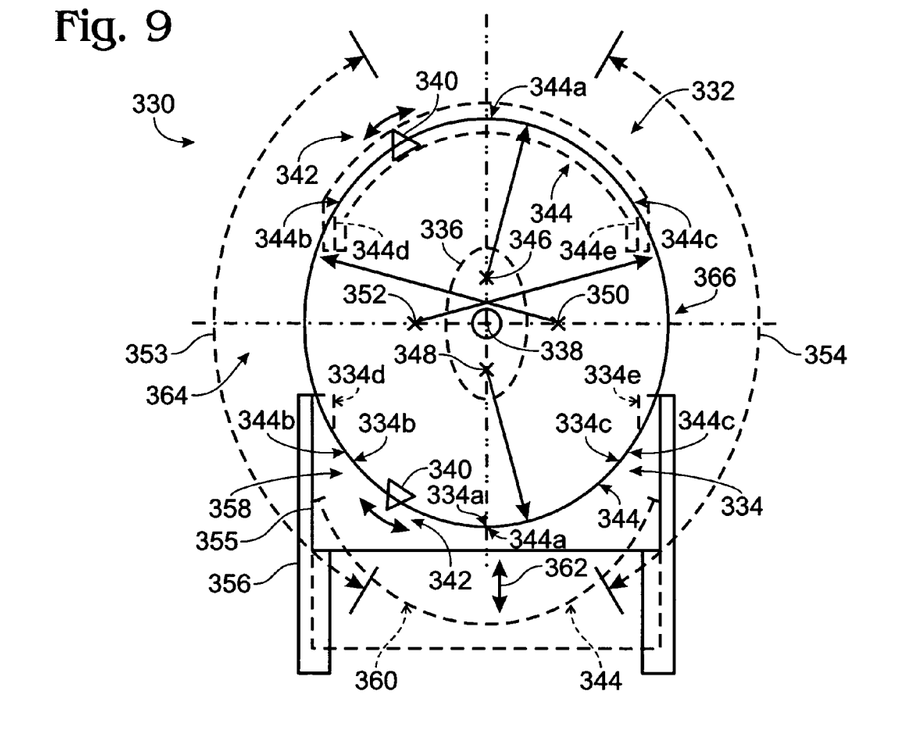

FIG. 9 illustrates an interrogation station 330 having first and second antenna apparatus 332 and 334 positioned on opposite sides of a subject position 336 having a subject center 338. In the embodiment shown, each antenna apparatus has an antenna unit 340 that may be part of an antenna array 342 that transmits and receives electromagnetic radiation along an arc 344.

Antenna apparatus 332 and 334 may be formed as combinations of antenna apparatus 82 and 132 described previously. Each arc 344 may have an intermediate portion 344a, with a respective center of curvature 346 and 348 positioned between the associated arc portion and the subject center. Each arc 344 also may have end portions 344b and 344c that have respective centers of curvature 350 and 352 positioned on the opposite side of the subject center from the associated arc portion. Optionally, terminal ends 344d and 344e may be formed in a straight line so that an antenna unit on that portion of the arc more directly faces a subject in the subject position.

Antenna units may be distributed along the respective arcs, may move along the arc, or both. Optionally, the arcs of the antenna apparatus, such as arcs 353 and 354, may include other arc portions. These arcs thus may include intermediate portions having respective centers 350 and 352, and end portions having respective centers 346 and 348.

In the example shown, first antenna apparatus 332 is fixed in position relative to the subject position, and second antenna apparatus 334 is adapted to move relative to the subject position. Second antenna apparatus 334 may be mounted relative to an apparatus frame 355 with a moving mechanism that is adapted to move antenna apparatus 334 relative to a base frame 356. The second antenna apparatus may thus be shifted between a first position 358, close to or proximal the subject position for imaging, and a distal, second position 360 spaced further away from the subject position. The antenna apparatus, thus, moves in a direction 362 that is transverse to associated arc 344.

Interrogation station 330 may be useful for providing a close-fitting enclosure, defined by opposing arcs 344, around a subject during imaging that has reduced-width passageways 364 and 366. A subject may then move into and out of the interrogation station through the passageways when the distance between the antenna arrays is increased. As an optional design, both of the antenna arrays can move toward and away from the subject position, and thereby toward and away from each other. In this case, first antenna apparatus 332 may be mounted relative to an apparatus frame 355' with associated moving mechanism that is adapted to move antenna apparatus 332 relative to a base frame 356'. If more antenna arrays surround the subject position, any combination of them can be made to move toward and away from the subject position.

Figure 10A:
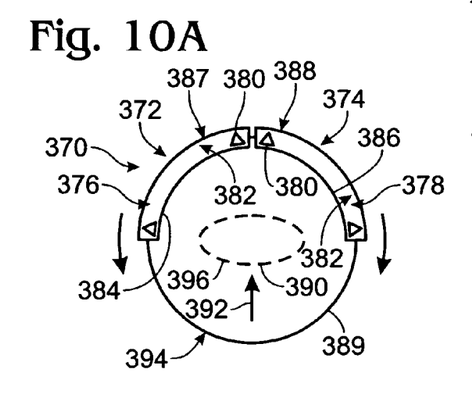
FIGS. 10A–10C are top views of another interrogation station illustrating a sequence of operation.
Figure 10B:
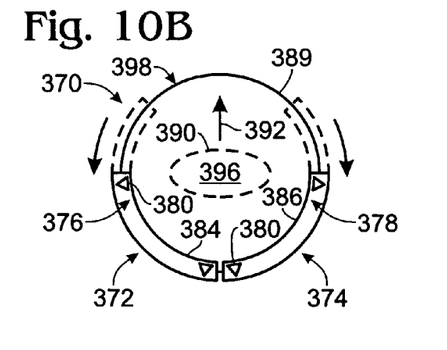
Figure 10C:
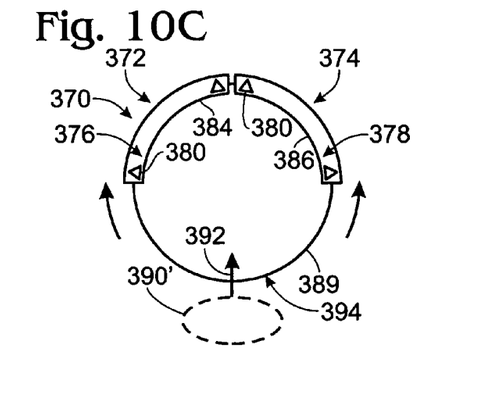

FIGS. 10 and 11 illustrate top views interrogation stations that include barriers around arcs associated with antennae apparatus in which the barriers move in the direction of the arcs. These arcs may be concentric or eccentric relative to the center of the subject position.

FIGS. 10A–10C depict an interrogation station 370 having first and second antenna apparatus assemblies 372 and 374, each having a respective antenna apparatus 376 and 378. Each antenna apparatus correspondingly includes one or more antenna units 380 and, if appropriate, an antenna array 382, such as has been described with reference to the previous figures. In particular, apparatus assemblies 372 and 374 include respective barriers 384 and 386 associated respectively with antenna apparatus 372 and 374. These barriers may cover or enclose associated arcs 387 and 388, along which electromagnetic radiation is transmitted and received, as has been described. The barriers may conform to the arcs, as shown, although other shapes may also be used. Apparatus assemblies 372 and 374 may be moved along an apparatus path, such as defined by a track 389.

As viewed in the figures, a subject 390 may enter interrogation station 370 along a subject path 392 through an entrance 394. Initially, barriers 384 and 386 may be abutting in a position downstream relative to a subject position 396 along path 392 and blocking an exit 398 from the interrogation station. This barrier supports the objective of having the subject stop on the subject position and remain there during imaging.

Initially, the antenna apparatus 376 and 378 may perform imaging along arcs 387 and 388 with the barriers in a starting or blocking position as shown in FIG. 10A. The barriers shown each span an arc of about 90 degrees, so the two antenna apparatus are able to scan half of a cylindrical aperture surrounding the subject position. Other lengths and shapes of arcs and other numbers of antenna apparatus assemblies may be used.

After scanning the first side of the subject, the antenna apparatus assemblies may move in opposite directions along track 389 to an upstream position on path 392 at the entrance 394 to the interrogation station. The other side of the subject is then scanned, and with the exit open, the subject may be allowed to leave the interrogation station, as shown in FIG. 10B. The antenna apparatus assemblies are then again moved along track 389 in opposite directions to the initial position blocking path 392 at exit 398, and opening entrance 394, permitting a second subject 390' to enter the interrogation station.

An interrogation station 400, illustrated in FIGS. 11A–11D, provides for continuous rotation of an antenna apparatus assembly 402. Assembly 402 is shown as having an antenna apparatus 404 extending along an arc 406 of about 120 degrees, although other arc lengths longer or shorter than arc 406 may be used. Antenna apparatus assembly 402 includes an antenna unit 408, which may be included in an antenna array 410. A barrier 412 may extend along the arc. The antenna apparatus assembly may be adapted to move along a path defined by a guide, as represented by a track 414. Track 414 extends at least partially around a subject position 416.

Figure 11A:
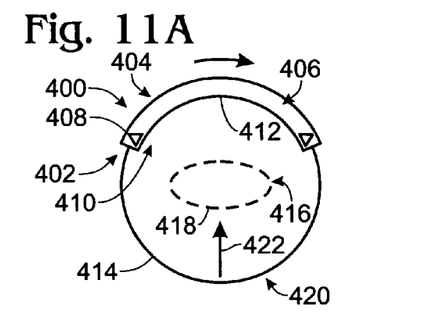
FIGS. 11A–11D are top views of yet another interrogation station illustrating a sequence of operation.
Figure 11B:
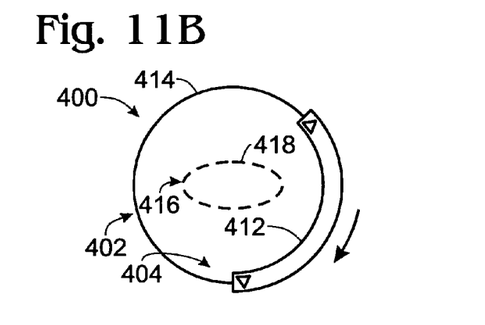

Initially, a subject 418 may enter the interrogation station through an entrance 420 and along a path 422, stopping at the subject position. The antenna apparatus 404 then performs imaging from positions along arc 406 with the barrier in a starting or blocking position shown in FIG. 11A. The barrier may block an exit 424 from the interrogation station, downstream along path 422 from the subject position. After scanning a first side of the subject, the antenna apparatus assembly moves along track 414 to a second position, which may be complementary to the initial position, as shown in FIG. 11B. The next 120 degrees of image of the subject may then be scanned.

Figure 11C:
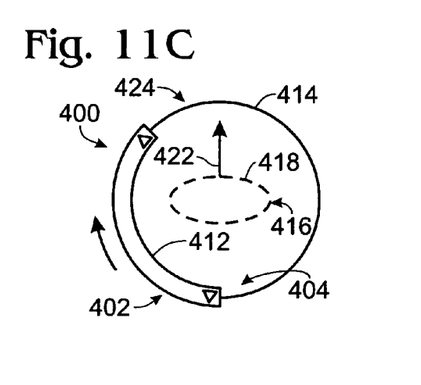
Figure 11D:
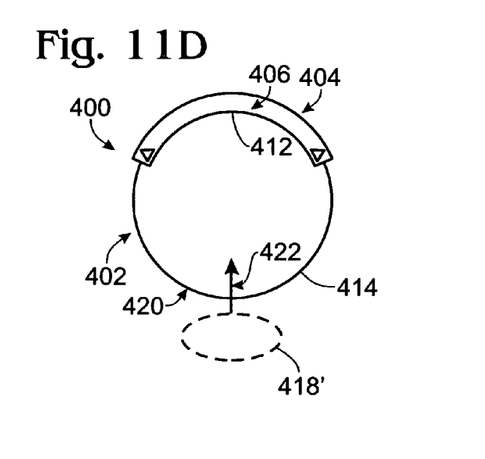

Assembly 402 then may move to a third position at which the final 120 degrees of scanning of the subject is performed, as shown in FIG. 11C. The exit from the interrogation station is open when assembly 402 in this third position, allowing the subject to leave the interrogation station. The antenna apparatus assembly 402 may then move along track 414 to the initial position, blocking path 422 at exit 424. With, the assembly in this position, entrance 420 is again unobstructed, permitting a second subject 418' to enter the interrogation station.

Figure 12:
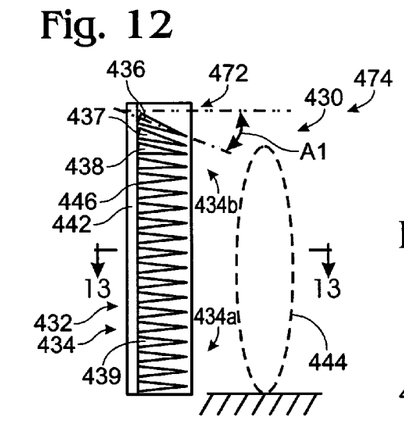
FIG. 12 is a side view of an interrogation station illustrating an exemplary antenna array configuration.

FIG. 12 illustrates a feature of an interrogation station 430 that may be used in various of the interrogation stations illustrated in the other figures. FIG. 12 illustrates simplistically an antenna apparatus 432 including a vertical array 434 of antenna units, including antenna units 436, 437, 438 and 439, represented by cone shapes for simplicity. Array 434 is mounted along a vertical frame 442. The array is generally directed toward a subject position 444 extending generally parallel to the array.

In a lower portion 434a of the array, the antenna units, including antenna unit 439, are mounted relative to the array to extend generally perpendicular to a line 446 corresponding to frame 442. In an upper portion 434b of the array, the antenna units are mounted at an acute angle to the line of the array. For instance, antenna unit 436 is shown to be mounted at an angle A1 of about 30 degrees from the perpendicular to the line of the array, or about 60 degrees relative to the line of the array. Any suitable angle may be used in a partucular application, as is appropriate to obtain the desired coverage of the subject Antenna units 437, 438 and others are at progressively increased angles relative to the line of the array until they align with the perpendicular to the array, as in lower array portion 434a. In this example, upper array portion 434b generally extends above the level of the subject position. The subject position can correspond to the expected general position of a subject located in the subject position. Accordingly, all of the antenna units are directed toward the subject position. The antenna units in upper array portion 434b then are able to provide an imaging perspective from above the subject position.

Figure 13:
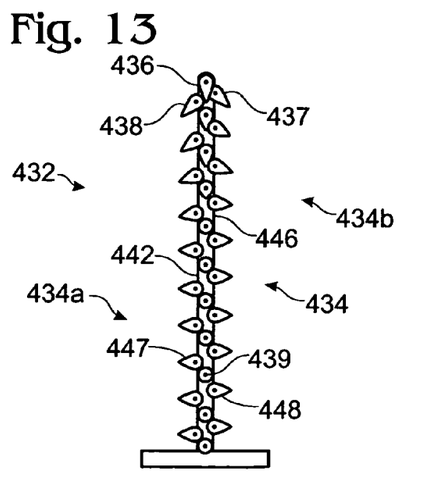
FIG. 13 is a front view of an optional embodiment of the antenna array of FIG. 12.

FIG. 13 illustrates a simplified front view of a variation of antenna apparatus 432 illustrated in FIG. 12. In this example, the antenna units in the lower portion 434a of array 434 are directed in different circumferential orientations or directions about the line 446 of the array. For example, antenna unit 439 is directed forward. Antenna units 447 and 448, respectively above and below antenna unit 439, may be directed left and right, respectively, as viewed in the figure. This pattern may be repeated along the array. In upper array portion 434b, the antenna units are variously directed left, forward, and right as in the lower array portion. Additionally, the antenna units may be directed downwardly at an acute angle, as was described with reference to FIG. 12. For example, antenna unit 436 may point downwardly and forward, antenna unit may point downwardly and to the right (from the perspective of a viewer of the figure), and antenna unit 438 may point downwardly and to the left. In this example, the amount that the antenna units are directed downwardly at an acute angle to the line of the array decreases with increasing distance down the array. Many other variations in antenna unit orientation may be used, as appropriate to provide imaging characteristics desired for a given application.

Figure 14:
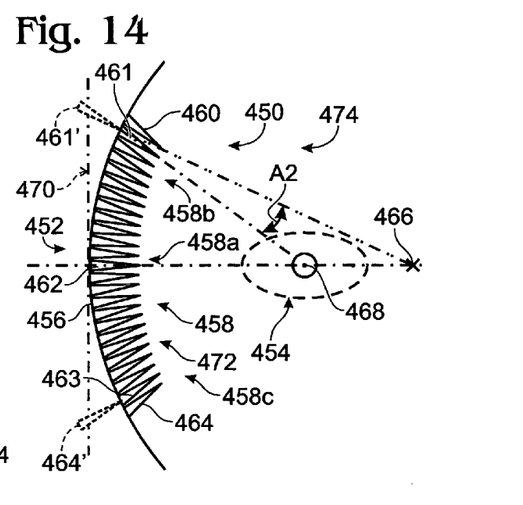
FIG. 14 is a top view of an interrogation station illustrating another exemplary antenna array configuration that can be the same interrogation station shown in FIG. 12.

Although this discussion has been directed to a vertical antennaarray, it also applies to horizontal antenna array. For example, FIG. 14 illustrates a simplified top view of another interrogation station 450 having an antenna apparatus 452 positioned adjacent to a subject position 454. In this example, the antenna apparatus extends along a line in the form of an arc 456. An antenna array 458 includes a plurality of antenna units, including antenna units 460, 461, 462, 463 and 464, are distributed along the arc. Arc 456 has a center of curvature 466 spaced from a center 468 of the subject position, as shown. Other shapes and curvatures of the arc may be used. For instance, the array could extend along a rectilinear line 470 and have antennae positioned at different angles versus position as shown in FIG. 12, but in a horizontal position.

Array 458 may include an intermediate portion 458a along which the antenna units, such as antenna unit 462, extend normal to the line of the array, which in this example is arc 456. The array also includes end portions 458b and 458c. The antenna units, such as antenna units 460, 461, 463 and 464, in these end portions are mounted at an acute angle relative to the arc. For example, antenna unit 461 is mounted at an angle A2 of about 10 degrees, corresponding to a complementary angle of about 80 degrees relative to the arc. The antenna units, then, in these end portions may be oriented more directly toward subject position 454 than would be the case if they were mounted orthogonally to the arc of the array.

Antenna array 458 may extend only horizontally along arc 456, in which case the side of a subject in a subject position facing the array may be fully scanned by mechanically moving the arc vertically. Optionally, an array 458 may be part of a two-dimensional array 472 of an interrogation station 474, which array also includes array 434 depicted in FIG. 12. For instance, the view of the array in FIG. 14 may be the view taken along line 13—13 in FIG. 12. If array 472 is large enough it may be possible to obtain an image of the side of a subject facing the array by electronically scanning the subject. In some examples, an image of only a portion of a subject may be desired; in which case, the array may correspond to only a portion of the subject.

Figure 15:
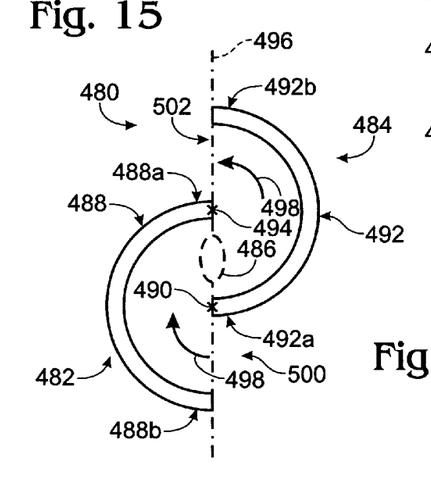
FIG. 15 is a top view of an interrogation station having laterally offset antenna array assemblies.

A top view of yet another form of interrogation station is illustrated in FIG. 15. An interrogation station 480 includes first and second antenna apparatus 482 and 484 positioned or adapted to be positioned relative to a subject position 486. Antenna apparatus 482 may include an antenna unit or array of antenna units adapted to transmit and receive electromagnetic radiation along an arc 488. Arc 488 in this example is semi-circular, extending from a first end 488a to a second end 488b around a center of curvature 490. Similarly, antenna apparatus 484 extends in a semi-circular arc 492 having first and second ends 492a and 492b, about a center of curvature 494. Barriers may be associated with these arcs, as has been described, and the arcs may correspond to movement or location of one or more antenna units during imaging of a subject. It is seen that center of curvature 490 is at the end 492a of arc 492. Similarly, center of curvature 494 is at the end 488a of arc 488. In this particular construction, then, the four arc ends, the two centers of curvature and the subject position are aligned along a common straight line 496.

In this configuration, first ends 488a and 492a of the arcs are positioned closer to the subject position than the other ends. The two arcs may be considered to be offset relative to each other, in that the arcs form an asymmetrical configuration about line 496. The arcs, thereby, form a partial definition of a subject path 498 having an entrance 500 and an exit 502. The subject position is located where the antenna arcs are located the closest to the subject path. Further, when the subject is in the subject position, the arcs surround the subject, allowing for imaging of all sides of the subject without moving an antenna apparatus or moving the subject. Further, the arcs define the boundaries of the path between the entrance and exit. Other configurations may also be used.

Imaging systems may be used in a wide variety of applications. They may be used in conventional fixed locations where security checks are currently made, such as in restricted facilities, or at entrances to public facilities that may be considered likely to be of interest to persons having destructive or adverse inclinations. In such installations, it is important to keep the imaging systems functional in order to interrogate a potentially continuous flow of personnel through the associated interrogation station or stations.

Imaging systems are also useful for the temporary interrogation of subjects in ad hoc applications that do not warrant a fixed or permanent installation. Examples include special or infrequent events, such as sports or political activities. Another example is a military operation in which troops are moving across a large territory, and check-points are set up at points of access for non-military personnel. For these applications, it may be desirable to have an imaging system that can be readily assembled for use, and then disassembled for reuse at another location.

Figure 16:
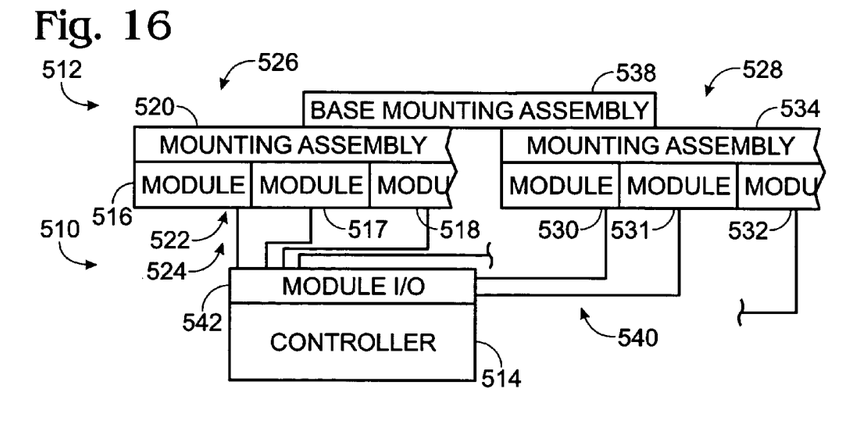
FIG. 16 is a general diagram depicting an imaging system having an interrogation station with a plurality of antenna apparatus segments.

FIGS. 15–19 illustrate various aspects of imaging systems that can facilitate assembly, disassembly, upgrading the imaging system, and maintenance. FIG. 16 is a block diagram of an imaging system 510 having an antenna apparatus 512 and a controller 514. The function and structure of imaging system 510 corresponds to imaging systems described above, and have the particular features described now.

Antenna apparatus 512 can include a plurality of segments or modules, such as array modules 516, 517 and 518. These modules in combination can form the antenna apparatus. A frame or mounting assembly 520 can join the various modules together in a given configuration, such as in an arc 522 of an array 524.

Optionally, the modules 516, 517 and 518 can form one of a plurality of interrogation segments, such as interrogation segment 526. Additional interrogation segments, such as interrogation segment 528, may be formed of associated modules, such as array modules 530, 531 and 532. Modules 530, 531 and 532 may be joined by a frame or mounting assembly 534. In turn, interrogation segments 526 and 528, and others, may be joined by a base mounting assembly 538, to form antenna apparatus 512.

A communication link, such as link 540, connects each module to a module input/output device 542 of controller 514.

Figure 17:
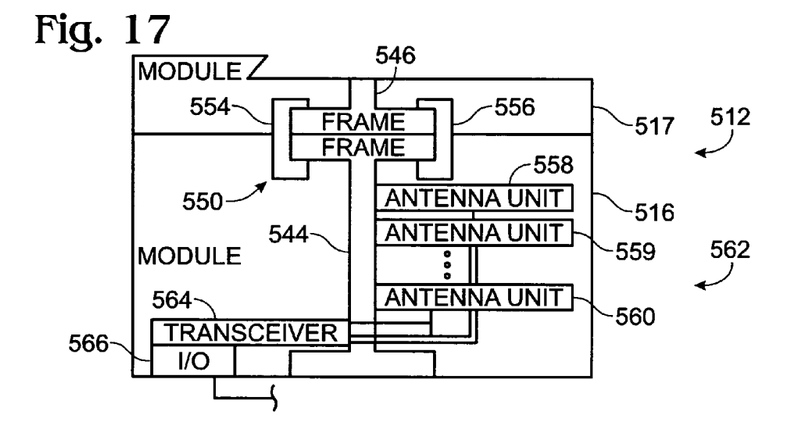
FIG. 17 is a general diagram depicting one example of an antenna apparatus segment usable in the interrogation station of FIG. 16.

FIG. 17 is a general schematic of one configuration of a first array module, such as module 516, connected to a second array module, such as module 517 of an antenna apparatus, such as antenna apparatus 512. Module 516 may include a frame 544 that is attached to a corresponding frame 546 of module 517. Frames 544 and 546 can be attached together in various configurations, such as by connection to a common frame or mounting assembly, or by joining them as segment frames, as shown, with an attachment assembly 552, such as brackets 554 and 556. Other structures may be used to attach the array modules together.

Each array module can have a plurality of antenna units, such as antenna units 558, 559 and 560. When the plurality of array modules is mounted together, the respective antenna units may form collectively an antenna array 562. Each antenna unit is in communication with a transceiver 564, which transceiver may be resident as part of the array module; mounted on a common base mounting assembly; or at a location remote from the antenna apparatus. The transceiver may then be in communication with a processor or other signal controller device, such as via an input/output device 566.

Figure 18:
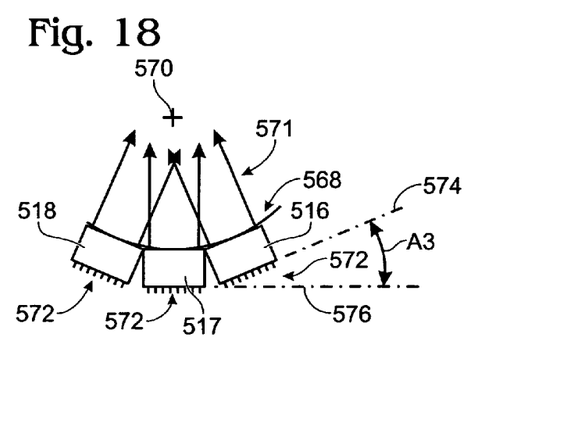
FIG. 18 is a plan view of a plurality of antenna array segments that may be used to form an antenna array.

FIG. 18 depicts a plurality of array modules, such as modules 516, 517 and 518, positioned along an arc 568 and directed toward a subject position 570 to form an antenna apparatus 571. In this example, each array module has a plurality of antenna units 572 disposed along a rectilinear line, such as lines 574 and 576 associated with modules 516 and 517. The array modules may be mounted at respective angles, such as angle A3, relative to each other. The result is that arc 568 is comprised of a plurality of chords. The same array modules can accordingly be configured to form any appropriate arc, including a rectilinear line for which the radius of curvature may be considered to be at an infinite distance.

Figure 19:
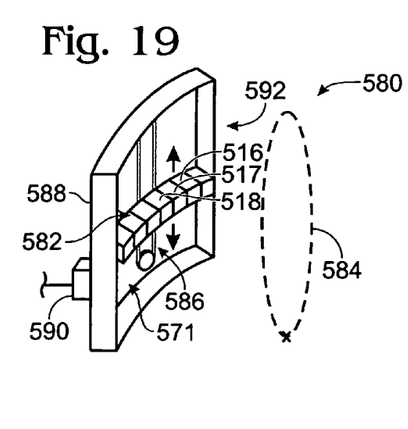
FIG. 19 is an isometric view of one example of an antenna apparatus segment.

An example of an interrogation station 580 using a plurality of array modules 516, 517 and 518 to form an antenna apparatus 571 is shown in FIG. 19. The array modules form an array 582 extending horizontally around a subject position 584. The array may be moved up and down to scan mechanically a subject in the subject position by a moving mechanism 586. A frame 588 forms a barrier that also supports the antenna apparatus. A transceiver 590 may control operation of the antenna array and antenna units during scanning of a subject.

Figure 20:
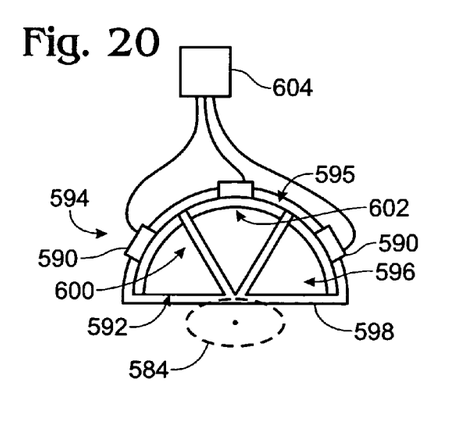
FIG. 20 is a top view of an interrogation station having a plurality of antenna apparatus segments.

Optionally, interrogation station 580 may be configured as an interrogation segment 592 that forms part of an interrogation station 594 shown in FIG. 20. As illustrated, interrogation station 594 may include a plurality of interrogation segments, such as segments 592, 595 and 596. The interrogation segments may be mounted collectively on a segment frame 598 to form a combined antenna array 600 formed by the arrays of each of the interrogation segments and extending along a combined arc 602. The transceivers 590 of the interrogation segments may be in communication with a shared controller 604. Optionally, the interrogation segments may share a single transceiver mounted separately, or a transceiver included in controller 604, as was described with reference to controller 24 of imaging system 20.

It will be appreciated that the foregoing imaging systems, interrogation stations and antenna apparatus have varying characteristics and features. Various of these features may be used in various combinations. For example, the antenna arrays described with reference to any of the interrogation stations may be constructed with array segments each having a plurality of arrays, transceivers, and/or may be constructed as interrogation segments. These array segments and interrogation segments facilitate maintenance, since faulty parts can be readily replaced, or the entire system may be readily assembled or disassembled, as appropriate. Further, an interrogation station may have antenna units mounted at differing angles along an arc or with different polarizations and beam angular width, either vertically or horizontally for the entire antennae apparatus, transmitting or receiving arrays, or individual antenna units within an arrayarray arc may be formed of antenna units formed in groups or segments extending along a line that varies from the arc, but collectively form the arc. Array segments may be oriented along the line of an array that varies from the perpendicular line of the array. Various combinations and configurations are therefore possible.

Some embodiments of imaging systems having any of the various described interrogation stations may use a transmitting signal that incorporates frequencies in the range of 24 to 30 GHZ, FMCW modulation, and having signal content that meets FCC unlicensed operation requirements and is outside of any restricted US Government frequency bands. Pulse lengths may range from 2–10 microseconds. Antennae beam widths may range from 20–120 degrees for broad beam implementation, or from 1 to 30 degrees for narrow beam width applications, depending on the image formation signal processor requirements. Various system polarizations may be used. Examples include same polarization, cross polarization, elliptical polarization, right circular polarization, and/or left circular polarization.

Accordingly, while the inventions defined in the following claims have been particularly shown and described with reference to the foregoing preferred embodiments, those skilled in the art will understand that many variations may be made therein without departing from the spirit and scope of the inventions. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present disclosure. The foregoing embodiments are illustrative, and no single feature or element is essential to all possible combinations that may be claimed in this or later applications. Where the claims recite "a" or "a first" element or the equivalent thereof, such claims should be understood to include one or more such elements, neither requiring nor excluding two or more such elements. Further, cardinal indicators, such as first, second or third, for identified elements are used to distinguish between the elements, and do not indicate a required or limited number of such elements, nor does it generally indicate a particular position or order of such elements.

INDUSTRIAL APPLICABILITY

The described imaging systems and components of imaging systems, as well as the methods relating thereto, are applicable to surveillance, metric, and other industries in which subject images are utilized.

The invention claimed is:

1. An imaging system comprising:
an array frame;
a plurality of antenna array segments adapted to be mounted to the array frame, each array segment including a segment frame, a plurality of antenna units mounted relative to the segment frame and configured to transmit toward and receive from a subject in a subject position, electromagnetic radiation in a frequency range of about 200 MHz to about 1 THz, from antenna positions spaced from the subject position, the array segments being oriented at different angles relative to each other and adapted to be mounted to the array frame with the antenna units from the array segments collectively forming an antenna array;

a transceiver configured to operate the antenna array and produce an output representative of the received radiation; and a processor adapted to convert the transceiver output into image data representative of an image of the subject.

2. A system according to claim 1, in which the antenna array extends along an arc.

3. A system according to claim 2, in which the plurality of antenna units in each antenna array segment extend rectilinearly along the segment frame relative to which they are mounted.

4. A method of imaging comprising:

transmitting toward a subject in a subject position, electromagnetic radiation in a frequency range of about 200 MHz to about 1 THz, from a plurality of antenna array segments, each array segment including a plurality of antenna units, with the antenna units from the array segments collectively forming an antenna array, with the antenna array segments being oriented at different angles relative to each other along the array;

receiving at each of the plurality of antenna array segments electromagnetic radiation reflected from the subject;

producing a segment output representative of the radiation received at each array segment; and converting the segment output into image data representative of an image of the subject.

5. A method according to claim 4, in which transmitting radiation includes transmitting radiation from antenna array segments extending along an arc.

6. A method according to claim 5, in which transmitting radiation includes transmitting radiation from antenna units extending rectilinearly in each antenna array segment.

7. A system of imaging comprising:

means for transmitting toward a subject in a subject position, electromagnetic radiation in a frequency range of about 200 MHz to about 1 THz, from a plurality of antenna array segments, each array segment including a plurality of antenna units, with the antenna units from the array segments collectively forming an antenna array, with the antenna array segments oriented at different angles relative to each other along the array;

means for receiving at each of the plurality of antenna array segments electromagnetic radiation reflected from the subject;

means for producing a segment output representative of the radiation received at each array segment; and means for converting the segment output into image data representative of an image of the subject.

* * * * *